United States Patent [19]

Ueno et al.

[11] 4,321,346

[45] Mar. 23, 1982

[54] TITANIUM TRICHLORIDE CATALYST AND PROCESS FOR THE PRODUCTION THEREOF

[75] Inventors: Hiroshi Ueno, Namekawa; Naomi Inaba, Ooi; Tukuo Makishima, Kawagoe; Koh Watanabe, Kunitachi; Shozo Wada, Zushi, all of Japan

[73] Assignee: Toa Nenryo Kogyo Kabushiki Kaisha, Tokyo, Japan

[21] Appl. No.: 111,171

[22] Filed: Jul. 20, 1979

Related U.S. Application Data

[60] Division of Ser. No. 10670, Feb. 9, 1979, Pat. No. 4,182,691, which is a continuation-in-part of Ser. No. 774,964, Mar. 7, 1977, abandoned.

[30] Foreign Application Priority Data

Mar. 8, 1976 [JP] Japan .................................. 51-24121

[51] Int. Cl.[3] .......................... C08F 4/64; C08F 10/06

[52] U.S. Cl. .................................... 526/142; 526/139; 526/140; 526/141; 526/144; 526/351

[58] Field of Search ......................................... 526/142

[56] References Cited

U.S. PATENT DOCUMENTS

| | | | |
|---|---|---|---|
| 3,701,763 | 10/1972 | Wada et al. | 526/142 |
| 3,825,524 | 7/1974 | Wada et al. | 526/142 |
| 4,123,387 | 10/1978 | Shiza et al. | 526/142 |
| 4,165,298 | 8/1979 | Shiza et al. | 526/142 |
| 4,207,205 | 6/1980 | Wristas | 526/142 |

FOREIGN PATENT DOCUMENTS

| | | | |
|---|---|---|---|
| 50-143790 | 11/1975 | Japan | 526/142 |
| 1391067 | 4/1975 | United Kingdom | 526/142 |

*Primary Examiner*—Edward J. Smith
*Attorney, Agent, or Firm*—B. C. Cadenhead; M. B. Kurtzman

[57] ABSTRACT

A titanium trichloride catalytic complex is produced by reducing titanium tetrachloride with an organo-metal compound and then treating the resulting reduced solids product with a chlorinated saturated hydrocarbon having two carbon atoms in the presence of a complexing agent. The resulting titanium trichloride complex composition, when employed as a co-catalyst with an organo-metal compound for Ziegler-type catalysts in polymerization of $\alpha$-olefins, results in uniform polymer grains with unexpectedly high polymerization activity and high stereoregular polymer yielding ratios.

16 Claims, No Drawings

TITANIUM TRICHLORIDE CATALYST AND PROCESS FOR THE PRODUCTION THEREOF

This is a division, of application Ser. No. 10,670, filed Feb. 9, 1979, now U.S. Pat. No. 4,182,691 which is a CIP of application Ser. No. 774,964, filed Mar. 7, 1977, and now abandoned.

BACKGROUND OF THE INVENTION

1. Field of Invention

This invention relates to a titanium trichloride catalyst useful as a catalyst component for the stereoregular polymerization of $\alpha$-olefins, whereby uniform polymer grains can be given with a high polymerization activity and a high stereoregular polymer ratio, and a process for producing the same.

2. Discussion of Prior Art

As a catalyst used for the stereoregular polymerization of $\alpha$-olefins, in general, are known halides of transition metal elements of low valency, for example, $\alpha$-type titanium trichloride obtained by reducing titanium tetrachloride with hydrogen, an eutectic substance of $\alpha$-titanium trichloride and aluminum chloride, obtained by reducing titanium tetrachloride with aluminum, $\delta$-type titanium trichloride obtained by crushing this eutectic substance and the like. As a method of modifying titanium trichloride, it has been proposed to add metal halides alkylaluminum compounds, halogenated hydrocarbons, ethers, esters, ketones, etc., optionally followed by grinding. For example, Japanese Patent Application (OPI) No. 59185/1973, published May 30, 1973, describes a method of modifying $\alpha$-type titanium trichloride by crushing $\alpha$-type titanium trichloride with halogenated hydrocarbons such as carbon tetrachloride, chloroform, dichloromethane and hexachloroethane. However, this method is disadvantageous in that other type titanium trichlorides than $\alpha$-type titanium trichloride cannot be used, preparation of the catalyst is complicated because of requiring a crushing treatment, etc., and the resulting catalyst is unsatisfactory in polymerization activity and stereoregular polymer yielding ratio.

Furthermore, there have been proposed in the art a method comprising reducing titanium tetrachloride with an organo aluminum compound, treating the thus obtained reduced solid containing titanium trichloride with a complexing agent to extract and remove the aluminum compounds and then treating with titanium tetrachloride (Japanese Patent Application (OPI) No. 34478/1972, published Nov. 21, 1972), a method comprising treating the same with carbon tetrachloride (Japanese Patent Application (OPI) No. 112289/1975, published Sept. 3, 1975) and a method comprising reducing titanium tetrachloride with an organo aluminum compound and then treating the thus obtained reduced solid containing titanium trichloride with a mixture of a complexing agent and carbon tetrachloride (Japanese Patent Application Publication No. Sho 52-35350 published Sept. 8, 1977.

Furthermore, in U.S. Pat. No. 3,825,524, there is disclosed a process for producing a titanium trichloride catalyst having high activity which includes extracting a crude titanium trichloride composition, obtained by reducing titanium tetrachloride with an organoaluminum chloride, with a mixed solvent system composed of (i) a main solvent of aliphatic or aromatic hydrocarbons, aromatic chlorinated hydrocarbons or trichloroethylene, and (ii) an auxilliary solvent, including ethers.

However, the first method wherein the after-treatment is carried out using titanium tetrachloride is poor economy since an expensive high concentration solution of titanium tetrachloride is required and the second method wherein the aftertreatment is carried out using carbon tetrachloride is advantageous in that expensive titanium tetrachloride can be substituted by cheap carbon tetrachloride, but is not always satisfactory since the yield of titanium trichloride is low due to the tendency of carbon tetrachloride to dissolve titanium trichloride and the resulting catalyst exhibits a low polymerization activity, low stereoregular polymer yielding ratio and an unfavorable grain shape of polymer.

SUMMARY OF THE INVENTION

We, the inventors, have made efforts to obtain a titanium trichloride catalyst whereby the disadvantages of these known titanium trichlorides or titanium trichloride compositions are overcome and consequently have found that a titanium trichloride catalyst comprising a titanium trichloride-containing reduced solid obtained by reducing titanium tetrachloride with an organo metal compound, in particular, organo aluminum compound, a chlorinated saturated hydrocarbon having two carbon atoms and a complexing agent can exhibit very excellent properties of $\alpha$-olefines. The present invention is based on this finding.

That is to say, the present invention provides a titanium trichloride catalyst complex comprising a titanium trichloride-containing reduced solid obtained by reducing titanium tetrachloride with an organo metal compound, a chlorinated saturated hydrocarbon having two carbon atoms and a complexing agent, which can be prepared by reducing titanium tetrachloride with an organo metal compound and then treating the resulting product with a chlorinated saturated hydrocarbon having two carbon atoms in the presence of a complexing agent.

DETAILED DESCRIPTION OF THE INVENTION

The titanium trichloride-containing reduced solid obtained by reducing titanium tetrachloride with an organo metal compound according to the present invention (which will hereinafter be referred to as "reduced solid") is a reduced solid substance which color is brown to red violet and which contains metal compounds, for example, aluminum compounds and has a complicated composition. As the organo metal compound there are generally used, individually or in combination, organo aluminum compounds, organo magnesium compounds and organo zinc compounds (which will hereinafter be referred to as "organo metal compounds"). In particular, the reduction is preferably conducted by the use of organo aluminum compounds. The reduced solid obtained in this way contains a metal compound or a mixture or complex compound thereof, in particular, an aluminum compound or a mixture or complex compound thereof in uniform state, which possibly interact with a complexing agent or a chlorinated saturated hydrocarbon having two carbon atoms to some extent, thus improving the catalytic property.

As the above-described organo aluminum compound there is generally used an organo aluminum compound represented by the general formula $R_nAlX_{3-n}$ wherein R represents an alkyl group or aryl group, X represents a halogen atom and n represents a suitable numeral within a range of $1 \leqq n \leqq 3$, or a mixture or complex compound thereof. In particular, it is preferable to use alkylaluminum compounds having 1 to 18 carbon atoms, preferably 2 to 6 carbon atoms, such as trialkylaluminums, dialkylaluminum halides, monoalkylaluminum dihalides and alkylaluminum sesquihalides, mixtures or complex compounds thereof. Examples of the trialkylaluminum are trimethylaluminum, triethylaluminum and tributylaluminum. Examples of the dialkylaluminum halide are dimethylaluminum chloride, diethylaluminum chloride, dibutylaluminum chloride, diethylaluminum bromide and diethylaluminum iodide. Examples of the monoalkylaluminum dihalide are methylaluminum dichloride, ethylaluminum dichloride, butylaluminum dichloride, ethylaluminum dibromide and ethylaluminum diiodide. Moreover, ethylaluminum sesquichloride is given as an example of the alkylaluminum sesquichloride. Triethylaluminum, diethylaluminum chloride, ethylaluminum dichloride, ethylaluminum sesquichloride or their mixtures or complex compounds, for example, a mixture of diethylaluminum chloride and ethylaluminum dichloride is particularly preferable because these compounds are readily obtainable commercially and exhibit excellent effects.

The reduction of titanium tetrachloride is ordinarily carried out by adding the above-described organo metal compound or its solution dropwise to a solution of titanium tetrachloride dissolved in an aliphatic hydrocarbon having 5 to 12 carbon atoms at a temperature of from −50° C. to +30° C., particularly about −5° C. to about +5° C., for a period of time for 30 minutes to 3 hours and the reverse addition method can be employed. The quantity of an organo metal compound used is ordinarily 1 to 5 gram atoms as metal per 1 gram atom of titanium. When titanium tetrachloride is reduced with diethylaluminum chloride (DEAC) or a mixture of DEAC and ethylaluminum dichloride (EADC), these reagents are preferably mixed in a molar ratio of $TiCl_4$:DEAC=1:1 to 1:5 and $TiCl_4$:DEAC:EADC=1:1:0.1 to 1:4:1.2. Furthermore, a mixture of titanium tetrachloride and an organo metal compound may be aged at a temperature of 20° to 100° C. for 1 to 3 hours, but this treatment is not always necessary. Then the resulting reduced solid is separated by a suitable method, optionally washed with an inert solvent and optionally dried, e.g., by heating to thus obtain the reduced solid of the invention. The reduced solid obtained in this way contains in a uniform state 0.2 gram atom or more of a metal compound or a mixture of complex thereof as the metal, for example, aluminum per 1 gram atom of titanium.

The titanium trichloride catalyst complex of the present invention can be obtained by subjecting the so obtained reduced solid to a treatment with a chlorinated saturated hydrocarbon having 2 carbon atoms in the presence of a complexing agent. As the chlorinated saturated hydrocarbon having 2 carbon atoms there can be used hexachloroethane, pentachloroethane, tetrachloroethane, trichloroethane, dichloroethane, monochloroethane and mixtures thereof. Said chlorinated saturated hydrocarbon having 2 carbon atoms also may be used with other chlorinated hydrocarbons, e.g., tetrachloroethylene, trichloroethylene, dichloroethylene and chloroethylene. The effect of such a chlorinated saturated hydrocarbon increases with the increase of the number of chlorine atoms. Hexachloroethane, pentachloroethane, tetrachloroethane, and trichloroethane are preferably used and, in particular, hexachloroethane and pentachloroethane are most preferable. This chlorinated hydrocarbon treatment is carried out by contacting the above-described reduced solid with a chlorinated saturated hydrocarbon having 2 carbon atoms in the presence of a complexing agent, but, in practice, it is desirable to effect this treatment by adding a mixture of the chlorinated hydrocarbon, a complexing agent and an inert solvent to the reduced solid or an inert solvent containing the reduced solid, since this procedure can be completed in simple manner with effective results. Of course, other methods can be employed, for example, which comprise firstly treating the reduced solid with a complexing agent and then contacting with the chlorinated hydrocarbon, or firstly contacting the reduced solid with the chlorinated hydrocarbon and then with a complexing agent. As the method for contacting the reduced solid with the chlorinated hydrocarbon and/or a complexing agent, it is also possible to add the reduced solid or a dispersion of the reduced solid in an inert solvent to the chlorinated hydrocarbon and/or a complexing agent or a mixture thereof with an inert solvent. Furthermore, it is possible to add the chlorinated hydrocarbon, a complexing agent and optionally an inert solvent to the reduced solid, followed by crushing.

For the above-described treatment with a chlorinated saturated hydrocarbon having 2 carbon atoms, there are optimum conditions depending on the property, composition and the like of the reduced solid, but in general, at a low temperature, this treatment should be carried out for a long time and at a high temperature, it can be carried out for a relatively short time. For example, the treatment time is generally 5 minutes to 20 hours at 0° to 170° C., preferably 30 minutes to 20 hours at 20° to 150° C. and more preferably 1 to 10 hours at 50° to 100° C., most preferably at about 60° to about 100° C. for 1 to 10 hours, but this is not always necessary.

The quantities of a chlorinated saturated hydrocarbon having 2 carbon atoms and a complexing agent are not particularly limited, but, in the case of using hexachloroethane, for example, 0.2 to 3.0 mols, preferably 0.4 to 2.0 mols of hexachloroethane and 0.1 to 2.5 mols, preferably 0.3 to 0.9 mol of a complexing agent are used per 1 gram atom of titanium.

When the reduced solid is treated with a complexing agent and then with the chlorinated hydrocarbon, for example, hexachloroethane, the contact with the complexing agent is carried out at 0° to 120° C. for 5 minutes to 8 hours, preferably at 20° to 90° C. for 30 minutes to 3 hours and then the contact with hexachloroethane is carried out at 20° to 150° C. for 30 minutes to 20 hours, preferably at 50° to 100° C. for 1 to 10 hours, and most preferably at about 60° to about 100° C. for about 1 to 10 hours. The quantities of a complexing agent and hexachloroethane used are not particularly limited in this case, but in general, 0.1 to 2.5 mols, preferably 0.3 to 0.8 mol of a complexing agent and 0.2 to 3.0 mols, preferably 0.4 to 2.0 mols of hexachloroethane are used per 1 gram atom of titanium.

The complexing agent used in the present invention means a compound containing one or more electron donating atoms or groups. That is to say, ethers, thioethers, thiols, organo phosphorus compounds, organo nitrogen compounds, ketones, esters and the like are used as such a compound. Useful examples of the ether are diethyl ether, diisopropyl ether, di-n-butyl ether, diisobutyl ether, diisoamyl ether, di-2-ethylhexyl ether, di-2-ethylheptyl ether, allyl ethyl ether, allyl butyl ether, diphenyl ether, anisole, phenetole, chloroanisole, bromoanisole, dimethoxybenzene, etc. Useful examples of the thioether are diethyl thioether, di-n-propyl thioether, dicyclohexyl thioether, diphenyl thioether, ditolyl thioether, ethyl phenyl thioether, propyl phenyl thioether, diallyl thioether, etc. Useful examples of the organo phosphorus compound are tri-n-butylphosphine, triphenylphosphine, triethyl phosphite, tributyl phosphite, etc. Useful examples of the organo nitrogen compound are diethylamine, triethylamine, n-propylamine, di-n-propylamine, tri-n-propylamine, aniline, dimethylaniline, etc. In particular, ethers are preferably used and, above all, those having 4 to 16 carbon atoms are more desirable, especially aliphatic ether compounds having 4 to 16 carbon atoms. As the inert solvent there are suitably used hydrocarbons, for example, aliphatic hydrocarbons such as pentane, hexane, heptane, octane and the like, alicyclic hydrocarbons such as cyclohexane, cyclopentane, and the like, aromatic hydrocarbons such as benzene, toluene, and the like, and mixtures thereof.

The so obtained titanium trichloride catalyst of the present invention is separated from the chlorinated hydrocarbon, complexing agent and inert solvent, optionally washed with an inert solvent and then contacted with an organo aluminum compound as a cocatalyst in conventional manner as it is or after drying, thus obtaining a catalyst for the polymerization of α-olefins. During the above-described treatment-activation step, the titanium trichloride of the reduced solid is converted whereby the so obtained titanium trichloride catalyst contains titanium trichloride of the δ-type, according to the classification generally adopted (Journal of Polymer Science, 51, 1961, pp. 399–410). The so obtained titanium trichloride catalyst has a violet to purple color.

The titanium trichloride catalyst complex of the present invention can exhibit best catalytic performances when containing a metal compound, in particular, aluminum compound, a mixture thereof or a complex compound thereof corresponding to the metal in a proportion of 0.0001 to 0.2 gram atom per 1 gram atom of titanium, a chlorinated saturated 2 carbon atom hydrocarbon, e.g., a chloroethane, in a proportion of 0.005 to 0.2 mol per 1 gram atom of titanium and a complexing agent in a proportion of 0.005 to 0.2 mol per 1 gram atom of titanium.

The titanium trichloride catalyst of the present invention is ordinarily used as a catalyst for the polymerization of α-olefins in contact with an organo metal compound which is used as a co-catalyst for the Ziegler-type catalyst, for example, monoalkylaluminum dichloride, dialkylaluminum monochloride or trialkylaluminum. If necessary, various compounds, for example, complexing agents such as used in the present invention can further be added as a third component.

The catalyst for the polymerization of α-olefins consisting of the titanium trichloride catalyst of the present invention and an organo aluminum compound is very excellent as a catalyst for the homopolymerization or copolymerization of α-olefins such as propylene, butene-1, 4-methylpentene-1, etc., and can give uniform polymer grains with a high polymerization activity and a high stereoregular polymer ratio in the polymerization of α-olefins in a gaseous phase, liquid monomer or inert solvent. Therefore, this catalyst will render great services to the industry.

The present invention will now be illustrated in detail by the following Examples in which a reduced solid obtained by reducing titanium tetrachloride with DEAC or a mixture of DEAC and EADC is used for the sake of convenience, but is not intended to be limited thereby. The following Examples, namely Examples 1 through 9 and 12 through 24 and all comparative and reference Examples, and Examples 25 through 53 are based on experiments actually performed and Examples 10 and 11 are extrapolations therefrom.

EXAMPLE 1

700 ml of purified heptane and 250 ml of titanium tetrachloride were charged into a 2000 ml flask equipped with a stirrer and placed in a thermostate kept at 0° C. and mixed. Then a mixture of 315 ml of DEAC (1.1 mol to 1 mol of titanium tetrachloride), 117 ml of EADC (0.5 mol to 1 mol of titanium tetrachloride) and 400 ml of purified heptane was dropwise added to this heptane solution of titanium tetrachloride kept at 0° C. for a period of 3 hours. After the dropwise addition, the reaction mixture was heated for 1 hour to 65° C. while stirring and the stirring was further continued at the same temperature for another hour to obtain a reduced solid. The resulting reduced solid was separated, washed with purified heptane and dried at 65° C. for 30 minutes under reduced pressure. The resulting reduced solid was red violet and the X-ray diffraction spectrum thereof showed that the peak at $2\theta=51.3°$ (δ-type crystal).

25 g of this reduced solid was suspended in 100 ml of purified heptane to prepare a suspension, to which hexachloroethane was then added in a proportion of 1 mol of hexachloroethane to 1 gram atom of titanium in the form of a solution containing 25 g of hexachloroethane in 100 ml and further di-n-butyl ether was added in a proportion of 0.6 mol of di-n-butyl ether to 1 gram atom of titanium, followed by stirring.

The thus mixed liquor was then heated with agitation to 80° C. and held for 5 hours, thus obtaining a titanium trichloride catalyst of the present invention. The resulting titanium trichloride catalyst was further washed five times with 100 ml of purified heptane and then dried at 65° C. for 30 minutes to obtain a powdered titanium trichloride catalyst with a yield of 95% as titanium.

The titanium trichloride catalyst obtained in this way contained aluminum compounds corresponding to 0.019 gram atom of aluminum, 0.023 mol of di-n-butyl ether and 0.011 mol of hexachloroethane per 1 gram atom of titanium.

A polymerization test was carried out as to a polymerization catalyst using the titanium trichloride catalyst of the present invention. 100 mg of the titanium trichloride catalyst and DEAC in a proportion of 4 mols to 1 gram atom of titanium were charged in a 1000 ml autoclave, into which 600 ml (normal state) of hydrogen and then 800 ml of liquid propylene were introduced. The contents in the autoclave was heated at 68° C. and polymerization was carried out for 30 minutes. Thereafter, the unreacted propylene was removed and then removal of the catalyst was carried out in conventional manner, by contacting the polymer with atmospheric moisture and by drying under vacuum, to obtain 204 g of polypropylene powder having a bulk density of 0.45 g/cc (ASTM D-1895, method A). Therefore, the polymerization activity (g of formed polymer per 1 g of catalyst, i.e., catalytic efficiency E) was 2040. The melt flow rate of this polypropylene (Melt Flow Rate—ASTM D 1238, hereafter referred to as MFR) was 4.9. The heptane-insoluble content (hereafter referred to as HI) of this polypropylene was 98% measured by extracting with heptane for 5 hours using a Soxhlet extractor. These results are shown in Table I. In this table, P.S.D. index is an index to show the particle size distribution of a polymer powder calculated by the following formula:

P.S.D. Index=log (particle diameter ($\mu$) at 90% of integral particle diameter distribution curve/particle diameter ($\mu$) at 10% of integral particle diameter distribution curve).

COMPARATIVE EXAMPLE 1

A polymerization test was carried out in the similar manner to Example 1 except using a reduced solid not treated with hexachloroethane and di-n-butyl ether in place of the titanium trichloride catalyst used in Example 1, thus obtaining results shown in Table I. It is apparent from this result that the performance of the titanium tichloride catalyst is remarkably improved by the treatment with hexachloroethane according to the present invention.

COMPARATIVE EXAMPLE 2

A polymerization test was carried out using a reduced solid treated in the similar manner to Example 1 except that hexachloroethane was not used, thus obtaining results shown in Table I. It is apparent from this result that it is important for the present invention to use hexachloroethane.

COMPARATIVE EXAMPLE 3

When a reduced solid was treated in the similar manner to Example 1 except that di-n-butyl ether (complexing agent) was not used, the reduced solid became massive. The reduced solid was subjected to a treatment with hexachloroethane, as in Example 1, at a treatment temperature of 35° C. for a treatment time of 16 hours without using the complexing agent, thus obtaining a titanium trichloride catalyst. Using this catalyst, a polymerization test was carried out in the similar manner to Example 1 to obtain a powdered polypropylene with E=400 and HI=94%.

It is apparent from the above-described result that it is important for the titanium trichloride catalyst of the present invention to treat a reduced solid with hexachloroethane in the presence of a complexing agent.

EXAMPLES 2 TO 5

A polymerization test was carried out using a titanium trichloride catalyst obtained by the same procedure as that of Example 1 except varying the temperature and period of time when the reduced solid of Example 1 was treated with hexachloroethane, thus obtaining results as shown in Table I.

TABLE I

| | Example | | | | | Comparative Example | |
|---|---|---|---|---|---|---|---|
| | 1 | 2 | 3 | 4 | 5 | 1 | 2 |
| Complexing Agent | Di-n-Butyl Ether | " | " | " | " | — | Di-n-Butyl Ether |
| Mol of Complexing Agent per 1 Gram Atom of Ti | 0.6 | " | " | " | " | — | 0.6 |
| Mol of Hexachloroethane per 1 Gram Atom of Ti | 1 | " | " | " | " | — | — |
| Treatment Temperature (0° C.) | 80 | 65 | " | 80 | 90 | — | 80 |
| Treatment Time (hr) | 5 | 2 | 5 | 2 | 2 | — | 5 |
| E | 2040 | 1660 | 1690 | 1700 | 1830 | 410 | 760 |
| HI | 98 | 96 | 97 | 97 | 98 | 77 | 68 |
| MFR | 4.9 | 6.1 | 5.1 | 4.8 | 7.1 | 9.0 | 6.8 |
| Bulk Density (g/cc) | 0.45 | 0.46 | 0.46 | 0.45 | 0.45 | 0.32 | 0.29 |
| PSD Index | 0.20 | 0.19 | 0.19 | 0.21 | 0.20 | 0.93 | 0.49 |
| Per 1 Mol of Catalyst Solid | | | | | | | |
| Mol of Complexing Agent | 0.023 | 0.019 | 0.010 | 0.022 | 0.018 | — | 0.09 |
| Mol of Aluminum Compound | 0.019 | 0.018 | 0.021 | 0.016 | 0.015 | 0.54 | 0.11 |
| Mol of Hexachloroethane | 0.011 | 0.012 | 0.30 | 0.027 | 0.033 | — | — |

EXAMPLES 6 TO 11

A titanium trichloride catalyst was prepared and a polymerization test was carried out in the similar manner to Example 1 except varying the quantity and variety of the complexing agent when the reduced solid was treated with hexachloroethane as in Example 1, thus obtaining results as shown in Table II.

TABLE II

| | Example | | | | | |
|---|---|---|---|---|---|---|
| | 6 | 7 | 8 | 9 | 10 | 11 |
| Complexing Agent | di-n-Butyl Ether | " | Di-n-Amyl Ether | Diisoamyl Ether | Di-n-Hep-tyl Ether | Di-2-Ethyl-hexyl Ether |
| Mol of Complexing Agent per 1 Gram Atom of Ti | 0.3 | 0.9 | 0.6 | Diisoamyl Ether | Di-n-Hep tyl Ether | Di-2-Ethyl-hexyl Ether |
| Mol of Hexachloroethane per 1 Gram Atom of Ti | 1 | " | " | Diisoamyl Ether | Di-n-Hep-tyl Ether | Di-2-Ethyl-hexyl Ether |
| Treatment Temperature (0° C.) | 80 | " | " | Diisoamyl Ether | Di-n-Hep-tyl Ether | Di-2-Ethyl-hexyl Ether |
| Treatment Time (hr) | 5 | " | " | Diisoamyl Ether | Di-n-Hep-tyl Ether | Di-2-Ethyl-hexyl Ether |
| E | 1490 | 1790 | 1640 | 2040 | 1890 | 1680 |
| HI | 97 | 98 | 97 | 97 | 96 | 97 |
| MFR | 4.6 | 4.8 | 6.3 | 5.1 | 5.0 | 5.9 |
| Bulk Density (g/cc) | 0.46 | 0.46 | 0.45 | 0.45 | 0.43 | 0.46 |
| Per 1 Mol of Catalyst Solid | | | | | | |

TABLE II-continued

| | Example | | | | | |
|---|---|---|---|---|---|---|
| | 6 | 7 | 8 | 9 | 10 | 11 |
| Mol of Complexing Agent | 0.020 | 0.083 | 0.024 | 0.026 | 0.048 | 0.032 |
| Mol of Aluminum Compound | 0.12 | 0.017 | 0.023 | 0.014 | 0.031 | 0.024 |
| Mol of Hexachloroethane | 0.012 | 0.018 | 0.017 | 0.010 | 0.020 | 0.018 |

EXAMPLES 12 TO 15

A titanium trichloride catalyst was prepared and a polymerization test was carried out in the similar manner to Example 1 except varying the quantity of hexachloroethane used when the reduced solid was treated with hexachloroethane as in Example 1, thus obtaining the results shown in Table III.

TABLE III

| | Example | | | |
|---|---|---|---|---|
| | 12 | 13 | 14 | 15 |
| Complexing Agent | Di-n-Butyl Ether | " | " | " |
| Mol of Complexing Agent per 1 Gram Atom of Ti | 0.6 | " | " | " |
| Mol of Hexachloroethane per 1 Gram Atom of Ti | 0.5 | 0.8 | 1.5 | 2.0 |
| Treatment Temperature (0° C.) | 80 | " | " | " |
| Treatment Time (hr) | 5 | " | " | " |
| E | 1690 | 1860 | 2010 | 1790 |
| HI | 97 | 98 | 97 | 98 |
| MFR | 5.4 | 6.3 | 4.8 | 4.9 |
| Bulk Density (g/cc) | 0.46 | 0.45 | 0.46 | 0.44 |
| Per 1 Mol of Catalyst Solid | | | | |
| Mol of Complexing Agent | 0.020 | 0.029 | 0.049 | 0.013 |
| Mol of Aluminum Compound | 0.018 | 0.017 | 0.022 | 0.032 |
| Mol of Hexachloroethane | 0.010 | 0.020 | 0.012 | 0.024 |

EXAMPLE 16

A titanium trichloride catalyst was prepared in the similar manner to Example 1 except that titanium tetrachloride was reduced with DEAC only. This titanium trichloride catalyst contained aluminum compounds corresponding to 0.021 gram atom of aluminum, 0.018 mol of butyl ether and 0.020 mol of hexachloroethane per 1 gram atom of titanium.

Using the so obtained titanium trichloride catalyst, a polymerization test was carried out in the similar manner to Example 1, thus obtaining a powdered polypropylene with E=1590, HI=97%, MFR=6.3 and bulk density=0.44 g/cc.

EXAMPLE 17

A polymerization test was carried out in the similar manner to Example 1, using the titanium trichloride catalyst obtained in Example 1 but adjusting the polymerization temperature to 73° C. and the polymerization time to 3 hours, thus obtaining a powdered polypropylene with E=12,000, HI=96%, MFR=5.3 and bulk density=0.44 g/cc.

EXAMPLE 18

The reduced solid obtained in Example 1 was suspended in 100 ml of purified heptane, mixed with di-n-butyl ether in a proportion of 0.6 mol to 1 gram atom of titanium and kept at 35° C. for 1 hour. The reduced solid was separated therefrom, mixed with hexachloroethane in a proportion of 1 mol to 1 gram atom of titanium in the form of a solution containing 25 g of hexachloroethane in 100 ml of heptane and heated at 80° C. for 5 hours to obtain a titanium trichloride catalyst, followed by washing and drying in an analogous manner to Example 1. Using this titanium trichloride catalyst, a polymerization test was carried out in the same manner as that of Example 1, thus obtaining a polypropylene powder with E=1500, HI=97%, MFR=3.8 and bulk density of 0.45 g/cc.

EXAMPLE 19

A titanium trichloride catalyst was prepared and a polymerization test was carried out in an analogous manner to Example 1 except using pentachloroethane in place of the hexachloroethane of Example 1, thus obtaining a powdered polypropylene with E=1579 and HI =97%.

EXAMPLE 20

A titanium trichloride catalyst was prepared and a polymerization test was carried out in an analogous manner to Example 1 except using 1,1,2,2-tetrachloroethane in place of the hexachloroethane of Example 1, thus obtaining a powdered polypropylene with E=1310 and HI=92%.

EXAMPLE 21

A titanium trichloride catalyst was prepared and a polymerization test was carried out using the titanium trichloride catalyst, in an analogous manner to Example 1 except using tetrachloroethylene in place of the hexachloroethane of Example 1, thus obtaining a powdered polypropylene with only E=1080 and HI=90%.

EXAMPLE 22

A titanium trichloride catalyst was prepared and a polymerization test was carried out using the titanium trichloride catalyst, in an analogous manner to Example 1 except using 1,2-dichloroethane in place of the hexachloroethane of Example 1, thus obtaining polypropylene powder with E=1250 and HI=92%.

EXAMPLE 23

The reduced solid obtained in Example 1 was suspended in heptane to prepare a suspension, to which di-n-butyl ether was added in a proportion of 0.6 mol to 1 gram atom of titanium, and the mixture was stirred at 65° C. for 1 hour. Then hexachloroethane in a proportion of 1 mol per 1 gram atom of titanium was added thereto in the form of the same solution as that of Example 1 and heated at 80° C. for 4 hours. Thereafter, the procedure of Example 1 was repeated to prepare a catalyst and then to effect a polymerization test using the same, thus obtaining a result with E=1950 and HI=98.1%.

EXAMPLE 24

Preparation of a titanium trichloride catalyst and polymerization test using the titanium trichloride catalyst were carried out in the similar manner to Example 1, except that, in place of the hexachloroethane and di-n-butyl ether used for the treatment of the reduced solid in Example 1, 0.6 mol of di-n-butyl ether, 1 mol of hexachloroethane and 0.3 mol of tetrachloroethylene were added and mixed with agitation, thus obtaining results of a titanium trichloride yield of 97% as titanium, E=2100, HI=98%, MFR=5.0 and bulk density=0.46 g/cc.

REFERENCE EXAMPLE 1

When 25 g of the reduced solid obtained in Example 1 was suspended in 100 ml of purified heptane, mixed with butyl ether in a proportion of 1 mol to 1 gram atom of titanium and carbon tetrachloride in a proportion of 4 mols to 1 gram atom of titanium and heated at 80° C. for 5 hours in an analogous manner to Example 1, the most part of titanium trichloride in the reduced solid was dissolved and the yield of a titanium trichloride catalyst was 5% as titanium. This catalyst was brown.

REFERENCE EXAMPLE 2

25 g of the reduced solid obtained in Example 1 was suspended in 100 ml of purified heptane, mixed with 1 mol of butyl ether and 4 mols of carbon tetrachloride per 1 gram atom of titanium and heated at 35° C. for 4 hours in an analogous manner to Example 1 to obtain a titanium trichloride catalyst. In this case, the titanium trichloride was also dissolved and the yield of the catalyst was only 40%. This catalyst was black brown.

Using the so obtained catalyst, a polymerization test was carried out in an analogous manner to Example 1, thus obtaining a powdered polypropylene with E=400, HI=85% and bulk density of 0.3 g/cc.

REFERENCE EXAMPLE 3

25 g of the reduced solid obtained in Example 1 was suspended in 100 ml of purified heptane, mixed with di-n-butyl ether in a proportion of 1 mol to 1 gram atom of titanium and kept at 35° C. for 1 hour. Then the reduced solid was separated therefrom, suspended in 100 ml of purified heptane, mixed with carbon tetrachloride in a proportion of 4 mols to 1 gram of titanium and kept at 35° C. for 16 hours, thus obtaining a titanium trichloride catalyst with a yield of 40%.

Using this titanium trichloride catalyst, a polymerization test was carried out in an analogous manner to Example 1, thus obtaining a powdered polypropylene with E=670, HI=84.5% and bulk density=0.33 g/cc.

EXAMPLES 25-27

25. (a) Two batches of titanium trichloride reduced solids material were prepared by the following procedure. 225 ml of refined dry n-dodecane and 55 ml titanium tetrachloride were introduced into a 1 l. flask under an argon atmosphere. The $TiCl_4$ solution was then cooled to −5° C. An homogeneous solution which was made from 350 ml dry n-dodecane and 115 ml of $Al(C_2H_5)_{1.5}Cl_{1.5}$, was added slowly into the flask under stirring for a period of three hours. During the addition process, the temperature of the reaction system was kept the same. The reaction mixture was further continuously stirred with the same temperature kept for an additional 2 hours to complete the reducing reaction. After the reduction reaction, the liquid phase was separated and the solid was washed 8 times with dry n-heptane to obtain 94.5 g and 98.5 g, respectively of reddish purple reduced solid material.

(b) 25 g of the reduced solid material was then suspended in 330 ml n-hexane. A mixed solution of 105 ml di-n-butyl ether and 193 ml of carbon tetrachloride was then added slowly to the suspension at 30° C. under continuous stirring. The amount of di-n-butyl ether used was 1.0 mol ratio to the titanium trichloride of the reduced solid material and the amount of carbon tetrachloride used was 4.0 mol ratio to the titanium trichloride. After the reaction addition the reactants were kept for 4 hours at the same temperature under stirring. The resulting formed solid was separated from the liquid phase and washed 8 times with n-hexane to obtain a purple solid catalyst. The amount of solid catalyst recovered equaled 52 wt.%, based upon the amount of reduced solid material used (Cat. Yield).

A polymerization test was then carried out in accordance with the procedure set forth in Example 1 utilizing 100 mg of the titanium trichloride catalyst of (b). The results are set forth in Table IV below.

26. 25 g of the reduced solid material obtained from the reduction step (a) of Example 25 was treated by repeating the treatment procedure (b) of Example 25, except hexachloroethane was substituted for carbon tetrachloride. The same mol ratios of di-n-butyl ether (1.0 mol ratio to the titanium trichloride) and chlorinated hydrocarbon (4.0 hexachloroethane mol ratio to the titanium trichloride) were used. However, additional n-hexane diluent had to be added to dissolve the solid hexachloroethane at the amount employed. Consequently, the slurry concentration of the reduction product was forced to be lowered to 38 g/l, as compared to slurry concentration in Example 25 (b), which was 180 g/l. The same treatment conditions were employed (30° C., 4 hr., continuous stirring) and the solid formed was separated and washed in the same manner, all as described in Example 25 (b). The recovered solid catalyst yield was 100 wt.%, based upon amount of reduced solid material treated. A polymerization test was carried out in accordance with Example 1 utilizing 100 mg of the obtained catalyst. The results are set forth in the following Table IV.

27. 25 g of the reduced solid material obtained from the reduction step (a) of Example 25 was treated by again repeating the treatment procedure (b) of Example 25, except that 1,2-dichloroethane was used in place of Carbon tetrachloride. A polymerization test in accordance with Example 1 was carried out using 100 mg of the obtained catalyst, the results being set forth in Table IV.

TABLE IV

| Ex. No. | R.S. | Activation Treatment | Cat. Yield | E | HI (%) | B.D. | MFR |
|---|---|---|---|---|---|---|---|
| 25 | 25 (a) | 1.0 n-BE + 4.0 $CCl_4$; 30° C., 4 hrs. | 52 | 1450 | 95.7 | 0.384 | 1.8 |
| 26 | 25 (a) | 1.0 n-BE + 4.0 $C_2Cl_6$; 30° C., 4 hrs. | 100 | 640 | 58.6 | CNM | 11.2 |
| 27 | 25 (a) | 1.0 n-BE + 4.0 | 100 | 590 | 53.4 | CNM | 12.5 |

TABLE IV-continued

| Ex. No. | R.S. | Activation Treatment | Cat. Yield | E | HI (%) | B.D. | MFR |
|---|---|---|---|---|---|---|---|
| | | $C_2H_4Cl_2$; 30° C., 4 hrs. | | | | | |

Polymerization Test : Per Example 1 ($C_3$ = bulk, 68° C., 0.5 hr., DEAC/Ti = 4 mol/mol, $H_2$ added)
R.S. = reduced solids used
Cat. Yield = wt. % of catalyst recovered after activation-treatment, based on reduced solids used
E = catalyst polymerization activity, grams-polymer/grams-catalyst
B.D. = bulk density (g/cc)
MFR = melt flow rate (g/10 min)
CNM = could not be measured The results in Table IV show the catalyst produced in Example 25 did exhibit suitable polymerization activity and heptane insolubles performance. However, the activation-treatment procedure of Example 25 resulted in recovery in only 52 wt.% of active catalyst, based upon amount of reduced solids employed. Moreover, the bulk density of the polymer produced was only 0.38 which, as described more particularly below, is significantly inferior to that obtained by catalysts of the present invention.

The results of Examples 26 and 27 set forth in Table IV show that use of hexachloroethane or dichloroethane in the treatment process of Example 25 does not produce a catalyst of acceptable catalytic performance with respect to any measurements.

EXAMPLES 28 AND 29

28. (a) A reduced solids product was produced specifically in accordance with the procedure described in Example 1, using 125 ml $TiCl_4$ in 350 ml n-heptane and 158 ml DEAC with 59 ml EADC in 200 ml n-heptane (4:1 mol ratio). 205 g of reduced solids product was recovered.

(b) 25 g of the above-reduced solids product was then treated with hexachloroethane and di-n-butyl ether by repeating the procedure described in Example 1 (1 mol hexachloroethane per 1 g atom of titanium and 0.6 mol di-n-butyl ether per 1 g atom of titanium; 80° C., 5 hrs.). Catalyst yield (wt.%, based upon reduced solids used) equaled 85 wt.%.

A polymerization test was then carried out in accordance with the procedure set forth in Example 1, utilizing 100 mg of the titanium trichloride catalyst of (b). The results are set forth in Table V below.

29. 25 g of the reduced solid product obtained from the reduction step (a) of Example 28 was treated by repeating the treatment procedure (b) of Example 28, except carbon tetrachloride was substituted for hexachloroethane. The same mol ratios of di-n-butyl ether (0.6 mol per 1 g atom of titanium) and chlorinated hydrocarbon (1.0 mol carbon tetrachloride per 1 g atom titanium was used. The same treatment conditions were employed (80° C., 5 hrs.). The recovered solid catalyst yield only equaled 11 wt.%. A polymerization test in accordance with Example 1 was attempted on the obtained catalyst. The polymerization test resulted in production of a residue containing very little solid polypropylene for which heptane insolubles and bulk density measurements could not be obtained, as set forth in Table V.

TABLE V

| Ex. No. | R.S. | Activation Treatment | Cat. Yield | E | HI (%) | B.D. | MFR |
|---|---|---|---|---|---|---|---|
| 28 | 28 (a) | 0.6 n-BE + 1.0 $C_2Cl_6$; 80° C., 5 hrs. | 85 | 2220 | 99.0 | 0.460 | 2.2 |
| 29 | 28 (a) | 0.6 n-BE + 1.0 $CCl_4$; 80° C., 5 hrs. | 11 | 0 | CNM | CNM | — |

See footnotes of Table IV.

A comparison of the results set forth in Table V show that substitution of carbon tetrachloride for the $C_2$ chlorinated saturated hydrocarbon in the activation-treatment of the present invention does not produce an active α-olefin polymerization catalyst. As shown by Example 29, use of carbon tetrachloride for activation-treatment at 80° C. for 5 hours resulted in an almost complete loss of titanium trichloride catalyst material. Moreover, that recovered was essentially useless for α-olefin polymerization. The results of Example 28 confirm the repeatability of Example 1 in producing a highly active α-olefin catalyst having superior catalytic performance and which produces a polymer having a bulk density (0.460 g/cc) superior to commercially available catalyst (specified hereafter).

EXAMPLES 30–34

30. 25 g of reduced solid product produced in Example 28 (a) (in accordance with Example 1) was treated according to the procedure of Example 25 (b). The treated catalyst yield equaled only 65 wt.% A polymerization test according to Example 1 was carried out using 100 mg of the treated catalyst, the results of which are set forth in Table VI.

31. 25 g of the reduced solid material obtained in Example 25 (a) was treated according to the procedure of Example 28 (b). The resulting catalyst yield equaled 87 wt.%. A polymerization test according to Example 1 was carried out using 100 mg of the treated catalyst, the results of which are set forth in Table VI.

32, 33 and 34. Three polymerization tests according to Example 1 were carried out, respectively, using, as the titanium catalyst component, 100 mg samples of the reduced solids material obtained from Example 25 (a), Example 28 (a), and a commercial ball-milled polypropylene catalyst obtained from Toyo Stauffer Company, Tokyo, Japan, under the tradename "AA" Catalyst. The results of the polymerization test are set forth in Table VI.

TABLE VI

| Ex. No. | R.S. | Activation Treatment | Cat. Yield | E | HI (%) | B.D. | MFR |
|---|---|---|---|---|---|---|---|
| 30 | 28 (a) | 1.0 n-BE + 4.0 $CCl_4$; 30° C., 4 hrs. | 65 | 640 | 85.1 | 0.280 | 8.3 |
| 31 | 25 (a) | 0.6 n-BE + 1.0 $C_2Cl_6$; 80° C., 5 hrs. | 87 | 1910 | 98.5 | 0.350 | 2.9 |
| 32 | 25 (a) | none | — | 480 | 71.9 | 0.342 | 18.1 |
| 33 | 28 (a) | none | — | 410 | 74.1 | 0.330 | 20.0 |
| 34 | — | commercial "AA" catalyst | — | 550 | 95.5 | 0.375 | 4.2 |

See footnotes of Table IV

In Table VI, the results of Example 30 show use of the activation-treatment procedure of Example 25 (b) (di-n-butyl ether+$CCl_4$; 30° C., 4 hrs.), when used to activate the reduced solids produced according to Example 28 (a) resulted in only 65% catalyst yield and that the resulting catalyst did not have satisfactory catalyst performance, both from the standpoint of catalyst activity and heptane insolubles. Compare Example 30 to Example 28, above, wherein the same reduced solids product was activated according to the present invention.

It will also be noted that, in Example 30, the activation treatment using carbon tetrachloride (per Example 25) resulted in a catalyst which produced a polymer product having only 0.280 g/cc bulk density, which is significantly lower than the bulk density of polymer produced using commercially available catalyst (Example 34, bulk density=0.375 g/cc). Moreover, the bulk density of polymer produced using a reduced solid of Example 28 (a) without an activation treat was 0.33 g/cc (Example 33). A comparison of Examples 30 and 33 show the activation treat using carbon tetrachloride in fact resulted in damaging the catalyst particle properties, i.e., particle porosity, shape, size, size distribution, and the life very much inasmuch as, as is known in the art, bulk density of resulting polymer product corresponds to titanium catalyst component particle properties. On the other hand, as shown by Example 28, above, the activation procedure of the present invention resulted in a catalyst having significantly improved catalyst particle properties as compared to the reduced solids (Example 33) and commercial "AA" catalyst (Example 34). Such bulk density comparative data confirms catalysts of the present invention (e.g., Example 28) are different from catalysts produced by an activation treatment using carbon tetrachloride under low temperature conditions (e.g., Example 30).

A comparison of the bulk density data of Examples 25, 31, 32 and 34 show that the reduced solids obtained in Example 25 (a) did not lend to production of catalysts having superior particle properties as compared to commercially available catalyst. Nevertheless, activation-treatment of the reduced solids of Example 25 (a) according to the present invention did result in obtaining high yields (87 wt.%) of catalyst having extremely good catalyst activity and exhibiting high heptane insolubles performance (Example 31), superior to that obtained by the activation procedure of Example 25.

EXAMPLES 35-39

A series of more severe polymerization tests were carried out employing the catalysts produced in Examples 25 and 28, the reduced solids produced in Examples 25 (a) and 28 (a) and a commercial ball-milled polypropylene catalyst obtained from Toyo Stauffer Company, Tokyo, Japan, under the tradename "AA". Each polymerization test was carried out in the following manner.

A magnetic driven 2 l. autoclave was dried thoroughly and displaced several times with dry nitrogen gas. 0.1 m mol (15 mg) of solid catalyst component and 1 m mol of DEAC were introduced into the autoclave under refined nitrogen gas atmosphere, and then 0.5 Kg $H_2$ gas was introduced. Liquid propylene, 700 g, was introduced and the temperature of the system was raised to 70° C. and kept at this temperature for 3 hours for the polymerization. At the completion of the polymerization, the excess propylene was exhausted and resulting polypropylene powder recovered. Catalytic activity, heptane insolubles, bulk density and MFR were determined according to Example 1. The results are set forth in the following Table VII.

TABLE VII

| Ex. No. | Cat. | E | HI (%) | B.D. | MFR |
|---|---|---|---|---|---|
| 35 | Ex. 25 | 5130 | 87.9 | 0.386 | 0.10 |
| 36 | Ex. 28 | 7400 | 98.6 | 0.453 | 0.12 |
| 37 | Ex. 25 (a) | 1230 | 64.9 | CNM | |
| 38 | Ex. 28 (a) | 1670 | 66.6 | CNM | |
| 39 | "AA" | 2290 | 91.7 | 0.401 | |

Polymerization Test: $C_3$ = bulk, 70° C., 3 hrs., DEAC/Ti = 10 mol/mol, $H_2$ added.
See footnotes of Table IV.

The results of Table VII confirm that even under severe polymerization conditions of high temperature and long residence time a catalyst of the present invention exhibits superior catalyst polymerization performance. Example 36 shows that, under the polymerization conditions, the catalyst of Example 28 had high polymerization activity while maintaining heptane insolubles and bulk density measurements. On the other hand, Example 35 shows that, under the severe polymerization conditions the catalyst of Example 25 lost heptane insolubles (compare Examples 35 and 25). Moreover, a comparison of the bulk density data of Table VII shows a catalyst of the present invention has superior catalyst particle properties which confirms the catalysts are different (compare Examples 36 and 35). It will be noted that the catalyst used in Example 35 under the severe polymerization conditions resulted in a polymer product having a bulk density lower than that of commercial "AA" catalyst (Example 39).

EXAMPLES 40-42

Titanium trichloride catalysts were prepared and polymerization tests were carried out by repeating Example 25, except in the activation step 25 (b), temperatures of 50° C., 60° C. and 70° C. were respectively employed. The results obtained are set forth in Table VIII.

TABLE VIII

| Ex. No. | R.S. | Activation Treatment | Cat. Yield | E | HI (%) | B.D. | MFR |
|---|---|---|---|---|---|---|---|
| 40 | 25 (a) | 1.0 n-BE + 4.0 $CCl_4$; 50° C., 4 hrs. | 17 | 1340 | 98.2 | 0.30 | 2.4 |
| 41 | 25 (a) | 1.0 n-BE + 4.0 $CCl_4$; 60° C., 4 hrs. | 4 | 4 | CNM | CNM | CNM |
| 42 | 25 (a) | 1.0 n-BE + 4.0 $CCl_4$; 70° C., 4 hrs. | 3 | 4 | CNM | CNM | CNM |

See footnotes of Table IV.

As shown by the results of Example 40, the activation procedure of Example 25, using carbon tetrachloride, at 50° C. did result in production of a catalyst having high polymerization performance with respect to activity and heptane insolubles. However, the treatment used resulted in recovery of only 17 wt.% solid catalyst which confirmed substantial loss of the reduced solids material during activation. Moreover, the polymer product had a bulk density of 0.30 g/cc which, when compared to Example 25, shows damage to catalyst particle properties. The results of Examples 41 and 42 confirm the results obtained in Example 29 to show that utilization of carbon tetrachloride at these activation treatment temperatures would be inoperable for production of a titanium catalyst component for α-olefin polymerization.

EXAMPLES 43–45

Titanium trichloride catalysts were prepared and polymerizations were carried out by repeating Example 28, except in the activation step of 28 (b), temperatures of 50° C., 60° C. and 70° C. were respectively employed. Results obtained are set forth in Table IX.

TABLE IX

| Ex. No. | R.S. | Activation Treatment | Cat. Yield | E | HI (%) | B.D. | MFR |
|---|---|---|---|---|---|---|---|
| 43 | 28 (a) | 1.0 n-BE + 1.0 $C_2Cl_6$; 50° C., 5 hrs. | 100 | 550 | 74.0 | 0.27 | 19.6 |
| 44 | 28 (a) | 1.0 n-BE + 1.0 $C_2Cl_6$; 60° C., 5 hrs. | 100 | 1340 | 96.1 | 0.42 | 5.6 |
| 45 | 28 (a) | 1.0 n-BE + 4.0 $C_2Cl_6$; 70° C., 5 hrs. | 100 | 1700 | 98.2 | 0.45 | 3.0 |

See footnotes of Table IV.

The results of Example 43 show that, under the specific treatment conditions employed, i.e., 50° C. for 5 hours using hexachloroethane and di-n-butyl ether, the treatment did not result in obtaining a titanium trichloride catalyst having high catalytic performance. However, the results of Example 44 and 45 confirm catalysts with superior catalytic performance can be obtained according to the present invention at treatment temperatures as low as about 60° C.

EXAMPLES 46–51

46. (a) A titanium trichloride reduced solids product was prepared as follows. A separable 2 liter flask, equipped with a stirrer, a dropping funnel, a thermometer, an inlet for nitrogen and an outlet for waste gas was charged with 1.5 liters of iso-octane. This system was then substituted with nitrogen. 132 ml of titanium tetrachloride were added to the flask and 110 ml of $Et_3Al_2Cl_3$ was added dropwise at 0° C. over 1 hour under stirring from the dropping funnel. After completion of the dropwise addition, the temperature was raised to 40° C. for 10 hours. The resulting solids were withdrawn by decantation and washed 4 times with nitrogen-substituted hexane. With use of a glass filter, the solids were separated into a hexane-insoluble solid and the hexane washing liquor. The solid was dried under reduced pressure at room temperature to obtain a trichloride reduced solids composition (A-3).

(b) A portion of the reduced solids product A-3 was then treated by the following extration washing step. A 500 ml separable flask equipped with a stirrer, a thermometer, an inlet for nitrogen and an outlet for waste gas was charged with 50 g of the titanium trichloride reduced solids composition A-3, and 300 ml of nitrogen-substituted toluene were added thereto. The temperature was raised to 70° C. under agitation and then anisole was added in an amount such that the molar ratio of anisole to titanium trichloride catalyst composition based on titanium was 0.5. The extraction was conducted at 70° C. for 2 hours. The extract and extraction residue were then separated in a nitrogen atmosphere with a G-3 glass filter, and the extraction residue on the filter was washed 3 times with 150 ml of nitrogen-substituted toluene and dried under reduced pressure to obtain a titanium trichloride catalyst. A polymerization test in accordance with Example 1 was conducted using 100 mg of the catalyst, whereby 62.6 g of polypropylene was obtained. The results of the test are set forth in Table X.

47. (a) The preparation of a titanium trichloride reduced solids composition (A-3) in accordance with Example 46 (a) was repeated. This titanium trichloride composition (A-3) was then suspended in iso-octane and heated at 140° C. for 2 hours. The resulting solids were withdrawn by decantation and washed 4 times with nitrogen-substituted hexane. With the use of a glass filter, the solids were separated into a hexane-insoluble solid and the hexane washing liquor. The solid was dried under reduced pressure at room temperature to obtain the titanium trichloride composition A-5.

(b) The titanium trichloride composition A-5 was then treated according to the extraction washing step of Example 46 (b), using toluene and anisole as described therein to obtain a titanium trichloride catalyst. A polymerization test according to Example 1 was then conducted, whereby 35.5 g of polypropylene was recovered. The test results are set forth in Table X.

48. A titanium trichloride composition was prepared in accordance with the procedures of Example 47 (a). This titanium trichloride composition (A-5) was then treated according to the extraction washing step procedure of Example 46 (b), except that chlorobenzene was used instead of toluene as the main solvent to obtain a titanium trichloride catalyst. A polymerization test according to Example 1 was then conducted, with 31.7 g polypropylene obtained. The test results are set forth in Table X.

49. A titanium trichloride composition was prepared in accordance with the procedure of Example 47 (a). This titanium trichloride composition (A-5) was then treated by the extraction washing step according to Example 46 (b), except that trichloroethylene was used instead of toluene as the main solvent to obtain a titanium trichloride catalyst. A polymerization test according to Example 1 was then conducted, with 36.6 g polypropylene obtained. The test results are set forth in Table X.

50 and 51. Titanium Trichloride catalysts were prepared, respectively, according to the procedures of Examples 48 and 49, except that di-n-butyl ether was used in place of anisole in the respective extraction washing treatment steps. Results of the polymerization tests using the titanium trichloride catalysts obtained are set forth in Table X.

TABLE X

| Ex. No. | R.S. | Extraction Wash Treatment | Cat. Yield | E | HI (%) | B.D. |
|---|---|---|---|---|---|---|
| 46 | 46 (a) A-3 | 0.5 Anisole in toluene, 70° C., 2 hrs. | 100 | 625 | 85.9 | 0.228 |
| 47 | 47 (a) A-5 | 0.5 Anisole in toluene, 70° C., 2 hrs. | 100 | 354 | 90.0 | 0.259 |
| 48 | 47 (a) A-5 | 0.5 Anisole in Chlorobenzene, 70° C., 2 hrs. | 100 | 317 | 89.0 | 0.248 |
| 49 | 47 (a) A-5 | 0.5 Anisole in $C_2HCl_3$, 70° C., 2 hrs. | 100 | 366 | 91.4 | 0.240 |
| 50 | 47 (a) A-5 | 0.5 n-BE in Chlorobenzene, 70° C., 2 hrs. | 100 | 460 | 91.8 | 0.242 |
| 51 | 47 (a) A-5 | 0.5 n-BE in $C_2HCl_3$, 70° C., 2 hrs. | 100 | 370 | 92.5 | 0.242 |

Polymerization Test: Per Example 1 ($C_3$ = bulk, 68° C., 0.5 hr., DEAC/Ti = 4 mol/mol, $H_2$ added)
See footnotes of Table IV.

The results of Table X show the procedures exemplified in Examples 46–51 did not result in production of a titanium trichloride catalyst having high overall catalytic performance for α-olefin polymerization. Catalysts prepared by these Examples were particularly lacking in catalyst activity (E) and catalyst particle properties (bulk density measurements). Compare results in Table X to any of Examples of the present invention hereinabove, e.g., 1, 19, 20, 22 and 28. A comparison of results of Examples 48 and 49 to those of Examples 46 and 47 also show that use of either chlorobenzene, an aromatic chlorinated hydrocarbon, or trichloroethylene, a $C_2$ unsaturated chlorinated hydrocarbon, in place of toluene, an aromatic hydrocarbon, did not result in a further improved titanium trichloride catalyst. Moreover, a comparison of the results of Examples 48 and 49 to those of 50 and 51 show the use of di-n-butyl ether, an aliphatic ether, in place of anisole, an aromatic ether, in the extraction step used did not substantially affect the resulting catalytic performance of the titanium trichloride catalysts produced.

EXAMPLES 52 and 53

Titanium trichloride catalysts were prepared and polymerization tests were carried out by repeating Example 28, except in the activation step 28(b), chlorobenzene and trichloroethylene were respectively employed in place of hexachloroethane. The results obtained are set forth in Table XI.

TABLE XI

| Ex. No. | R.S. | Treat | Cat. Yield | E | HI (%) | B.D. | MFR |
|---|---|---|---|---|---|---|---|
| 52 | 28 (a) | 0.6 n-BE + 1.0 Chlorobenzene, 80° C., 5 hrs. | 100 | 920 | 90.4 | 0.33 | 5.0 |
| 53 | 28 (a) | 0.6 n-BE + 1.0 $C_2HCl_3$ 80° C., 5 hrs. | 100 | 760 | 82.8 | 0.325 | 8.4 |

See footnotes of Table IV.

A comparison of the results set forth in Table XI to any of those exemplifying the present invention (e.g., Examples 28, 1, 19, 20 and 22) confirm unexpected results obtained by activation utilizing a $C_2$ saturated chlorinated hydrocarbon in accordance with the present invention. In Examples 52 and 53, activation treatment using either chlorobenzene or trichloroethylene in accordance with Example 28 did not result in a titanium trichloride catalyst of comparable catalytic performance for α-olefin polymerization. Moreover, the bulk density measurements of polymer product show use of chlorobenzene or trichloroethylene in the activation treatment step employed adversely affected the resulting catalyst particle properties, confirming different catalysts being produced.

What is claimed is:

1. A process for the stereoregular polymerization of α-olefins which comprises contacting under α-olefin polymerization conditions and α-olefin with a catalyst system comprising an organometal compound cocatalyst and a titanium trichloride catalyst, said titanium trichloride produced by:

(i) reducing titanium tetrachloride with an organometal compound of the formula $R_nAlX_{3-n}$, wherein R is an alkyl or aryl group having from 1 to 18 carbon atoms, X is a halogen, and n is a numeral in the range of $1 \leq n \leq 3$ at a temperature of from about −50° C. to about +30° C. to produce a reduced solids product;

(ii) contacting said reduced solids product with a chlorinated saturated hydrocarbon having 2 carbon atoms in the presence of a complexing agent selected from aliphatic ethers having 4 to 16 carbon atoms at a temperature of from about 60° C. to about 100° C. for about 1 to 10 hours thereby producing a titanium trichloride catalyst component containing titanium trichloride of the deltatype; and (iii) recovering the resulting titanium trichloride catalyst component.

2. The process of claim 1, wherein said chlorinated hydrocarbon is selected from chlorinated saturated hydrocarbons, or mixtures of chlorinated unsaturated hydrocarbons and chlorinated saturated hydrocarbons.

3. The process of claim 1, wherein R is an alkyl group having 2 to 6 carbon atoms.

4. The process of claim 1, wherein the chlorinated hydrocarbon is selected from hexachloroethane, pentachloroethane, tetrachloroethane, trichloroethane, dichloroethane, and mixtures thereof.

5. The process of claim 1 wherein said reduced solids product is contacted with the chlorinated hydrocarbon in a ratio of about 0.2 to about 3.0 moles chlorinated hydrocarbon per one gram atom of titanium, and with said complexing agent at a ratio of about 0.1 to about 2.5 moles complexing agent per 1 gram atom of titanium.

6. The process of claim 1 wherein the reduced solids product is contacted with a mixture of the chlorinated hydrocarbon and complexing agent.

7. The process of claim 1 wherein the reduced solids product is first mixed with the chlorinated hydrocarbon.

8. The process of claim 1 wherein the reduced solids product is first mixed with the complexing agent at an elevated temperature of about 20° C. to about 90° C. for about 30 minutes to about 3 hours prior to the addition of said chlorinated hydrocarbon.

9. The process of claim 8 wherein the reduced solids product is separated from the complexing agent after mixture therewith and then mixed with the chlorinated hydrocarbon.

10. The process of claim 1 wherein the complexing agent is an ether selected from di-n-butyl ether, di-n-amyl ether, diisoamyl ether or mixtures thereof.

11. The process of claim 4 wherein said chlorinated hydrocarbon is hexachloroethane.

12. The process of claim 4 wherein said chlorinated hydrocarbon is pentachloroethane.

13. The process of claim 4 wherein said chlorinated hydrocarbon is tetrachloroethane.

14. The process of claim 4 wherein said chlorinated hydrocarbon is dichloroethane.

15. The process of claim 1 wherein the α-olefin is selected from propylene, butene-1 and 4-methylpentene-1.

16. The process of claim 15 wherein the α-olefin is propylene.

* * * * *